US008610753B2

(12) United States Patent
Serizawa et al.

(10) Patent No.: US 8,610,753 B2
(45) Date of Patent: Dec. 17, 2013

(54) OPTICAL SCANNER AND IMAGE FORMING APPARATUS INCLUDING SAME

(75) Inventors: Keiichi Serizawa, Kanagawa (JP); Takeshi Yamakawa, Kanagawa (JP); Kazunori Watanabe, Tokyo (JP); Hiroshi Johno, Kanagawa (JP); Tomoya Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 13/137,740

(22) Filed: Sep. 9, 2011

(65) Prior Publication Data

US 2012/0062685 A1 Mar. 15, 2012

(30) Foreign Application Priority Data

Sep. 14, 2010 (JP) ................................ 2010-206023

(51) Int. Cl.
*B41J 2/44* (2006.01)
*G02B 26/10* (2006.01)

(52) U.S. Cl.
USPC ............ 347/242; 347/245; 347/257; 347/263

(58) Field of Classification Search
USPC ......... 347/241, 242, 243, 244, 245, 256, 257, 347/258, 259, 260, 261, 263
See application file for complete search history.

(56) References Cited

U.S. PATENT DOCUMENTS

| | | | | |
|---|---|---|---|---|
| 7,643,191 | B2 * | 1/2010 | Okuwaki et al. | 359/204.1 |
| 7,817,177 | B2 * | 10/2010 | Hayashi et al. | 347/242 |
| 8,134,766 | B2 * | 3/2012 | Ichii | 359/210.1 |
| 2012/0200655 | A1 * | 8/2012 | Serizawa et al. | 347/224 |

FOREIGN PATENT DOCUMENTS

| | | |
|---|---|---|
| JP | 05-072457 | 3/1993 |
| JP | 2007-171626 | 7/2007 |
| JP | 2008-096957 | 4/2008 |
| JP | 2008-102291 | 5/2008 |
| JP | 4500738 | 4/2010 |

OTHER PUBLICATIONS

Machine-generated translation of JP 2006-350251, published on Dec. 2006.*
Abstract of JP 2006-350251 published on Dec. 28, 2006.

* cited by examiner

*Primary Examiner* — Huan Tran
(74) *Attorney, Agent, or Firm* — Harness, Dickey & Pierce, P.L.C.

(57) ABSTRACT

An optical scanner includes a light source, an optical part, a housing, and a retainer. The light source projects light against a target. The optical part is disposed on a light path between the light source and the target. The housing houses the light source and the optical part. The retainer fixed to the housing holds the optical part and includes a plurality of flanges disposed along an outer circumference of the retainer. One of the plurality of flanges of the retainer is adhered to the housing an adhesive agent. An image forming apparatus includes the optical scanner.

13 Claims, 8 Drawing Sheets

OPTICAL SCANNER AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2010-206023, filed on Sep. 14, 2010, in the Japan Patent Office, the entire disclosure of which is hereby incorporated herein by reference.

BACKGROUND OF THE INVENTION

1. Field of the Invention

Exemplary aspects of the present invention generally relate to an optical scanner and an image forming apparatus including same.

2. Description of the Related Art

Related-art image forming apparatuses, such as copiers, facsimile machines, printers, or multifunction printers having at least one of copying, printing, scanning, and facsimile functions, typically form an image on a recording medium according to image data. Thus, for example, a charger uniformly charges a surface of an image bearing member; an optical writing unit serving as an optical scanner projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Typically, an image forming apparatus is equipped with an optical writing unit serving as an optical scanner to form a latent image on an image bearing member, for example, a photoconductive drum. The optical writing unit illuminates and scans the image bearing member with a light beam also known as write light based on image information. Subsequently, the latent image is developed with toner, thereby forming a visible image, also known as a toner image.

Generally, such an optical writing unit includes a light source to project the light beam, optical parts such as a collimating lens, a scanning lens, a reflective mirror, and a polygon mirror. The light beam projected from the light source such as a laser diode (LD) passes through the collimating lens attached to a housing of the optical writing unit. The collimating lens shapes the light beam into a desired shape. Then, the light beam strikes the polygon mirror. The light beam is deflected and scanned by the polygon mirror, and passes through the scanning lens, the reflective mirror, and so forth. Ultimately, the light beam illuminates the image bearing member. In general, the collimating lens is fixed directly to the housing an adhesive agent.

Due to heightened awareness of environmental problems in recent years, there is increasing market demand for recycling the optical parts used in the optical writing unit. However, the optical parts such as the collimating lens are fixed directly and firmly to the housing adhesives to prevent the optical parts from displacement during and/or after shipment, thereby complicating efforts to separate the optical parts from the housing for recycling. For example, the optical parts need to be handled directly and separated forcibly.

The optical parts have finely processed surfaces that receive or project light so as to obtain certain optical characteristics. Such optical parts are very sensitive to damage and mechanical stress. When separating the optical parts from the housing upon recycling, the optical parts may be damaged, causing undesirable changes in the optical characteristics of the optical parts. For this reason, the optical parts are difficult to recycle, and hence are usually discarded.

In view of the above, there is demand for optical parts that can be recycled easily without getting damaged.

BRIEF SUMMARY OF THE INVENTION

In view of the foregoing, in one illustrative embodiment of the present invention, an optical scanner includes a light source, an optical part, a housing, and a retainer. The light source projects light against a target. The optical part is disposed on a light path between the light source and the target. The housing houses the light source and the optical part. The retainer fixed to the housing holds the optical part and includes a plurality of flanges disposed along an outer circumference of the retainer. One of the flanges is adhered to the housing an adhesive agent.

In another illustrative embodiment of the present invention, an image forming apparatus includes the optical scanner.

Additional features and advantages of the present invention will be more fully apparent from the following detailed description of illustrative embodiments, the accompanying drawings, and the associated claims.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF THE INVENTION

Figure 1:
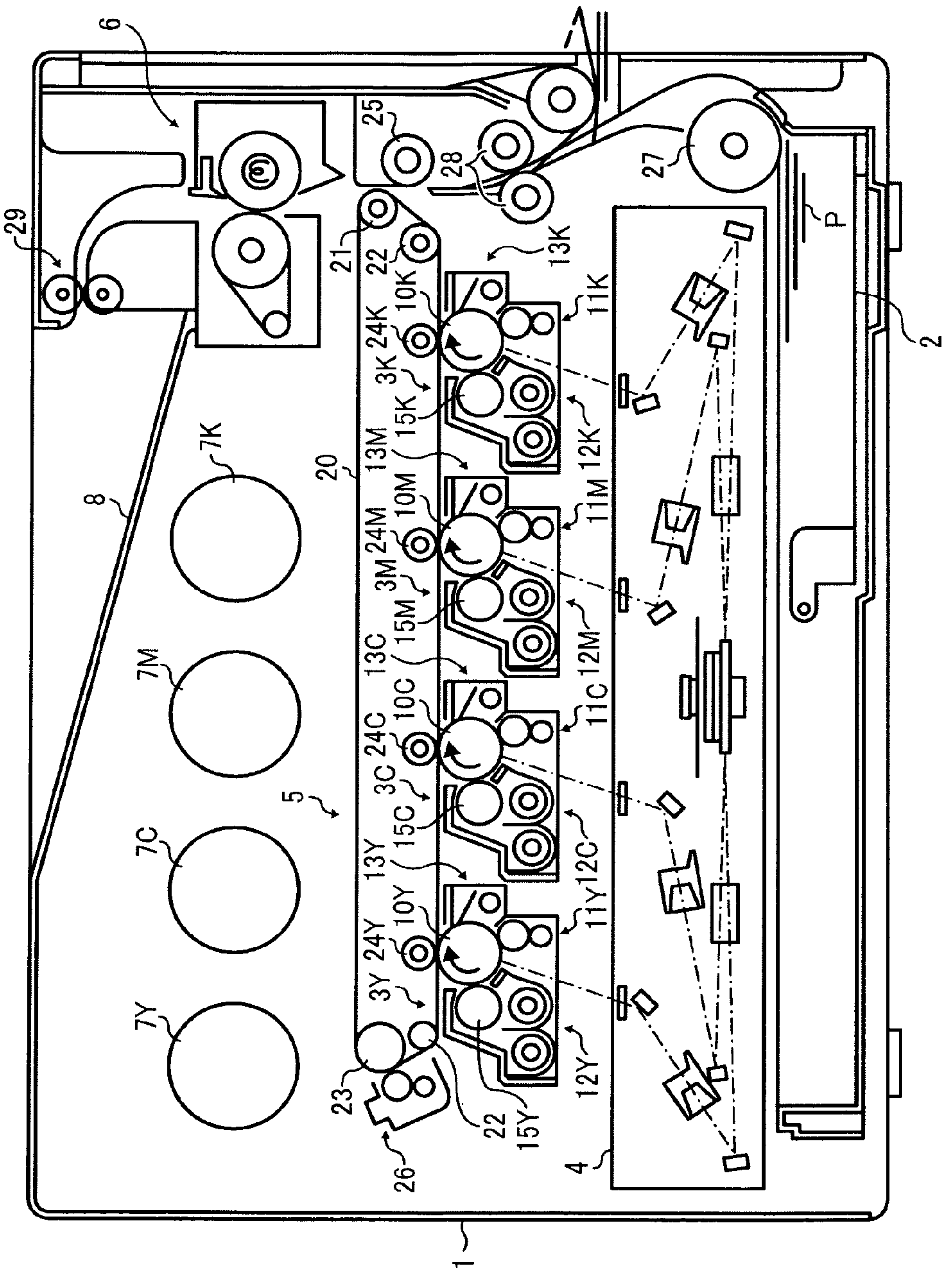
FIG. 1 is a schematic diagram illustrating a printer as an example of an image forming apparatus, according to an illustrative embodiment of the present invention.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms “a”, “an” and “the” are intended to include the plural forms as well, unless the context clearly indicates otherwise. Moreover, the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 2:
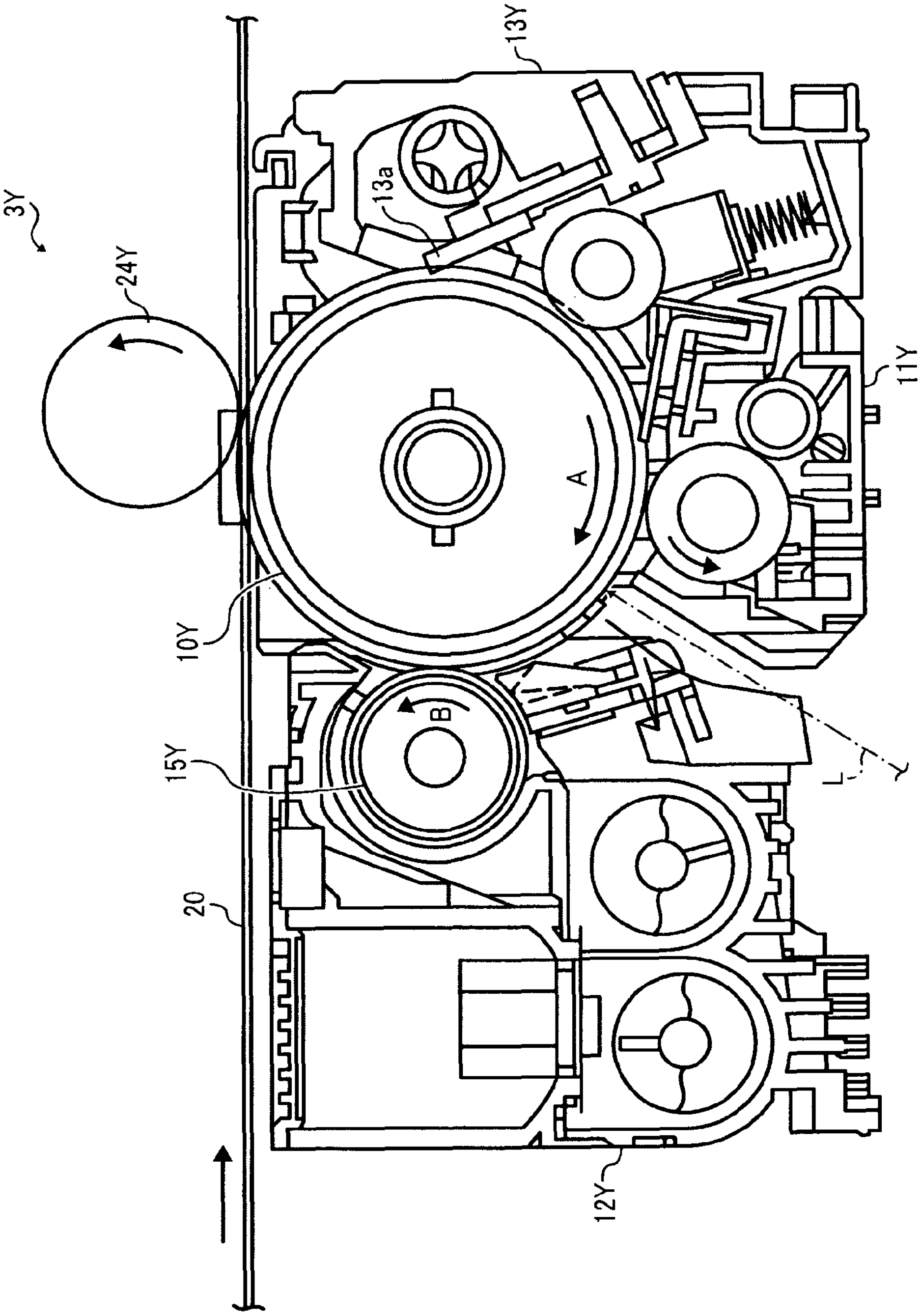
FIG. 2 is a schematic diagram illustrating an image forming station employed in the image forming apparatus of FIG. 1.

Referring now to the drawings, wherein like reference numerals designate identical or corresponding parts throughout the several views, and initially with reference to FIGS. 1 and 2, a description is provided of an example of an image forming apparatus according to an illustrative embodiment of the present invention.

FIG. 1 is a schematic diagram illustrating an electrophotographic color laser printer as an example of the image forming apparatus. FIG. 2 is a schematic diagram illustrating an image forming station 3Y as a representative example of image forming stations employed in the image forming apparatus.

As illustrated in FIG. 1, the image forming apparatus includes a housing 1 and a sheet cassette 2. Image forming stations 3Y, 3C, 3M, and 3K are disposed substantially at the center of the housing 1. The image forming stations 3Y, 3C, 3M, and 3K form toner images, also known as visible images, of the colors yellow (Y), cyan (C), magenta (M), and black (K), respectively. It is to be noted that the image forming stations 3Y, 3C, 3M, and 3K all have the same configuration as all the others, differing only in the color of toner employed.

It is to be noted that reference characters Y, C, M, and K denote the colors yellow, cyan, magenta, and black, respectively. To simplify the description, the reference characters Y, C, M, and K indicating colors are omitted herein unless otherwise specified.

As illustrated in FIG. 1, the image forming stations 3Y, 3C, 3M, and 3K include photoconductive drums 10Y, 10C, 10M, and 10K, respectively, each serving as a latent image bearing member that rotates in a direction indicated by an arrow A. The photoconductive drums 10Y, 10C, 10M, and 10K are formed of an aluminum cylinder base having a diameter of approximately 40 mm covered with a photosensitive layer, for example, an organic photoconductive (OPC) layer.

The image forming stations 3Y, 3C, 3M, and 3K include charging devices 11Y, 11C, 11M, and 11K each disposed around the photoconductive drums 10Y, 10C, 10M, and 10K, to charge the photoconductive drums 10Y, 10C, 10M, and 10K. Developing devices 12Y, 12C, 12M, and 12K, and cleaning devices 13Y, 13C, 13M, and 13K are also disposed around the respective photoconductive drums 10Y, 10C, 10M, and 10K. The developing devices 12Y, 12C, 12M, and 12K develop latent images formed on the photoconductive drums 10Y, 10C, 10M, and 10K with toner. The cleaning devices 13Y, 13C, 13M, and 13K clean residual toner remaining on the photoconductive drums 10Y through 10K.

An optical writing unit 4 serving as an optical scanner is disposed substantially below the image forming stations 3Y, 3C, 3M, and 3K. The optical writing unit 4 illuminates the photoconductive drums 10Y, 10C, 10M, and 10K with a write light beam L to optically scan the photoconductive drums 10Y through 10K.

An intermediate transfer unit 5 is disposed substantially above the image forming stations 3Y, 3C, 3M, and 3K. The intermediate transfer unit 5 includes an intermediate transfer belt 20 wound around a plurality of rollers and formed into a loop. Toner images formed in the image forming stations 3Y, 3C, 3M, and 3K are transferred onto the intermediate transfer belt 20.

The image forming apparatus includes a fixing device 6. The fixing device 6 fixes the toner image transferred onto a recording medium P from the intermediate transfer belt 20.

The toner bottles 7Y, 7C, 7M, and 7K storing toner of yellow, cyan, magenta, and black, respectively, are disposed at an upper portion of the housing 1. The toner bottles 7Y, 7C, 7M, and 7K can be removed from the housing 1 by opening a sheet discharge tray 8 provided at the upper portion of the housing 1.

The optical writing unit 4 serving as an optical scanner includes a laser diode serving as a light source. The laser diode projects the write light beam L against polygon mirrors 41*a* and 41*b* (shown in FIG. 3). The polygon mirrors 41*a* and 41*b* are a regular polygonal prism including multiple mirror surfaces. The write light beam L is deflected in a main scanning direction by the mirror surfaces of the polygon mirrors 41*a* and 41*b* while rotating. Subsequently, the write light beam L reflected by the plurality of mirrors scans the photoconductive drums 10Y, 10C, 10M, and 10K which have been charged uniformly by the charging devices 11Y, 11C, 11M, and 11K. Accordingly, electrostatic latent images of yellow, cyan, magenta, and black are formed on the surfaces of the photoconductive drums 10Y, 10C, 10M, and 10B, respectively. A detailed description of the optical writing unit 4 is provided later.

The intermediate transfer belt 20 of the intermediate transfer unit 5 serving as a transfer mechanism is wound around a drive roller 21, a tension roller 22, and a driven roller 23, and rotates in a counterclockwise direction in FIG. 1 at a predetermined timing. The intermediate transfer unit 5 includes primary transfer rollers 24Y, 24C, 24M, and 24K to primarily transfer the toner images formed on the photoconductive drums 10Y, 10C, 10M, and 10K onto the intermediate transfer belt 20 so that they are superimposed one atop the other, thereby forming a composite color toner image.

The image forming apparatus includes a secondary transfer roller 25 and a belt cleaning device 26. The secondary transfer roller 25 transfers the composite toner image primarily transferred onto the intermediate transfer belt 20 to the recording medium P. The belt cleaning device 26 cleans the residual toner remaining on the intermediate transfer belt 20 after the transfer process.

Next, a description is provided of forming a color image.

In the image forming stations 3Y through 3K, the photoconductive drums 10Y through 10K are uniformly charged by the charging devices 11Y through 11K. Subsequently, based on image information, the photoconductive drums 10Y through 10K are exposed with the write light beam L, thereby forming electrostatic latent images thereon. The electrostatic latent images are developed with toner of the respective colors borne on developing rollers 15Y, 15C, 15M, and 15K of the developing devices 12Y, 12C, 12M, and 12K, thereby forming toner images of the colors yellow, cyan, magenta, and black.

The primary transfer rollers 24Y, 24C, 24M, and 24K transfer primarily the toner images of the colors yellow, cyan, magenta, and black from the photoconductive drums 10Y, 10C, 10M, and 10K onto the intermediate transfer belt 20 rotating in the counterclockwise direction so that they are superimposed one atop the other, thereby forming a composite color toner image. The toner images are transferred from the photoconductive drums 10Y, 10C, 10M, and 10K onto the intermediate transfer belt 20 from the upstream side to the downstream side in the direction of movement of the intermediate transfer belt 20 at different timing so that the toner images are transferred at the same position on the intermediate transfer belt 20.

Each of the cleaning devices 13Y through 13K is equipped with a cleaning blade 13*a* (shown in FIG. 2). After the primary transfer, the cleaning blade 13*a* cleans the surface of the photoconductive drums 10Y through 10K in preparation for the subsequent imaging cycle.

The toner in the toner bottles 7Y, 7C, 7M, and 7K is supplied to the developing devices 12Y, 12C, 12M, and 12K of the image forming stations 3Y, 3C, 3M, and 3K via a transport path, not illustrated, as necessary.

The recording medium P in the sheet cassette 2 is sent to a sheet conveyance path in the housing 1 by a sheet feed roller 27 disposed substantially near the sheet cassette 2. The recording medium P is temporarily stopped by a pair of registration rollers 28, and is sent to a secondary transfer portion constituted by the secondary transfer roller 25 and the intermediate transfer belt 20 at a predetermined timing. In the secondary transfer portion, the toner image formed on the intermediate transfer belt 20 is transferred onto the recording medium P. The recording medium P bearing the toner image passes through the fixing device 6 so that the toner image is fixed on the recording medium P. Subsequently, the recording medium P is discharged onto the sheet discharge tray 8 by a sheet discharge roller 29. Similar to the photoconductive drums 10, the residual toner remaining on the intermediate transfer belt 20 is cleaned by the belt cleaning device 26 contacting the intermediate transfer belt 20.

Figure 3:
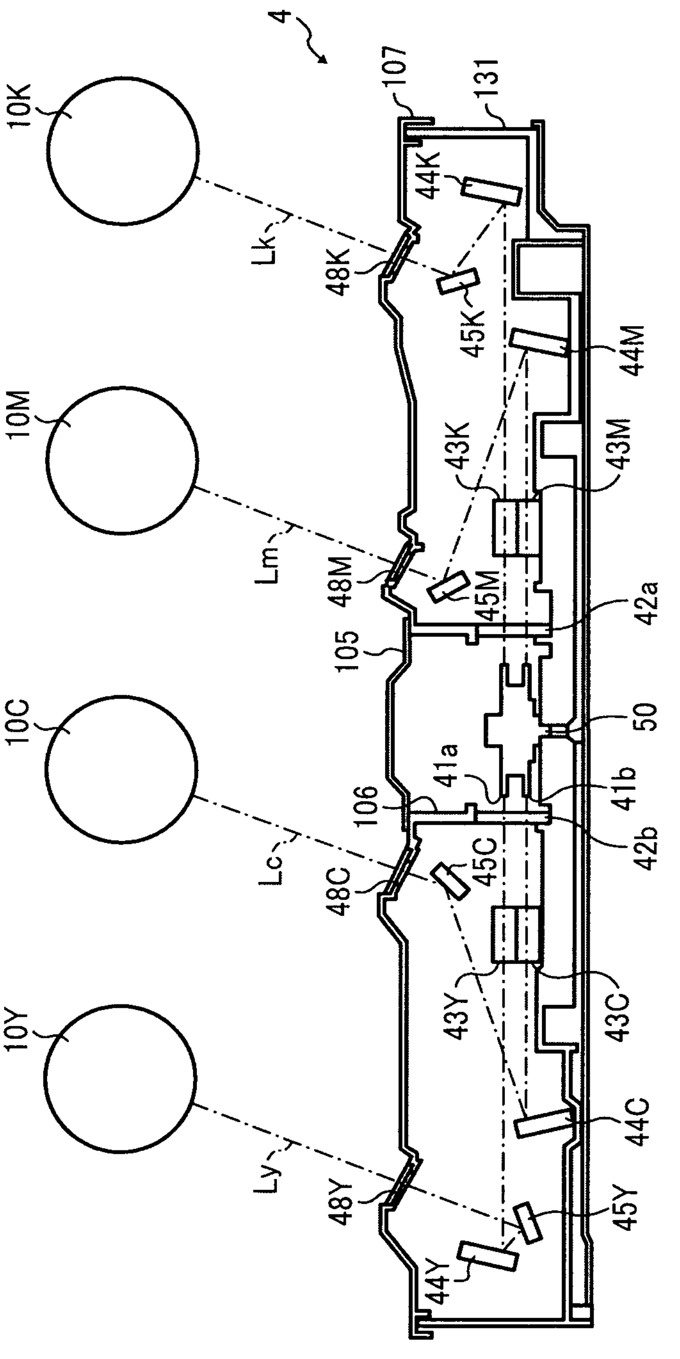
FIG. 3 is a schematic diagram illustrating image bearing members and an optical writing unit serving as an optical scanner according to an illustrative embodiment of the present invention.
Figure 4:
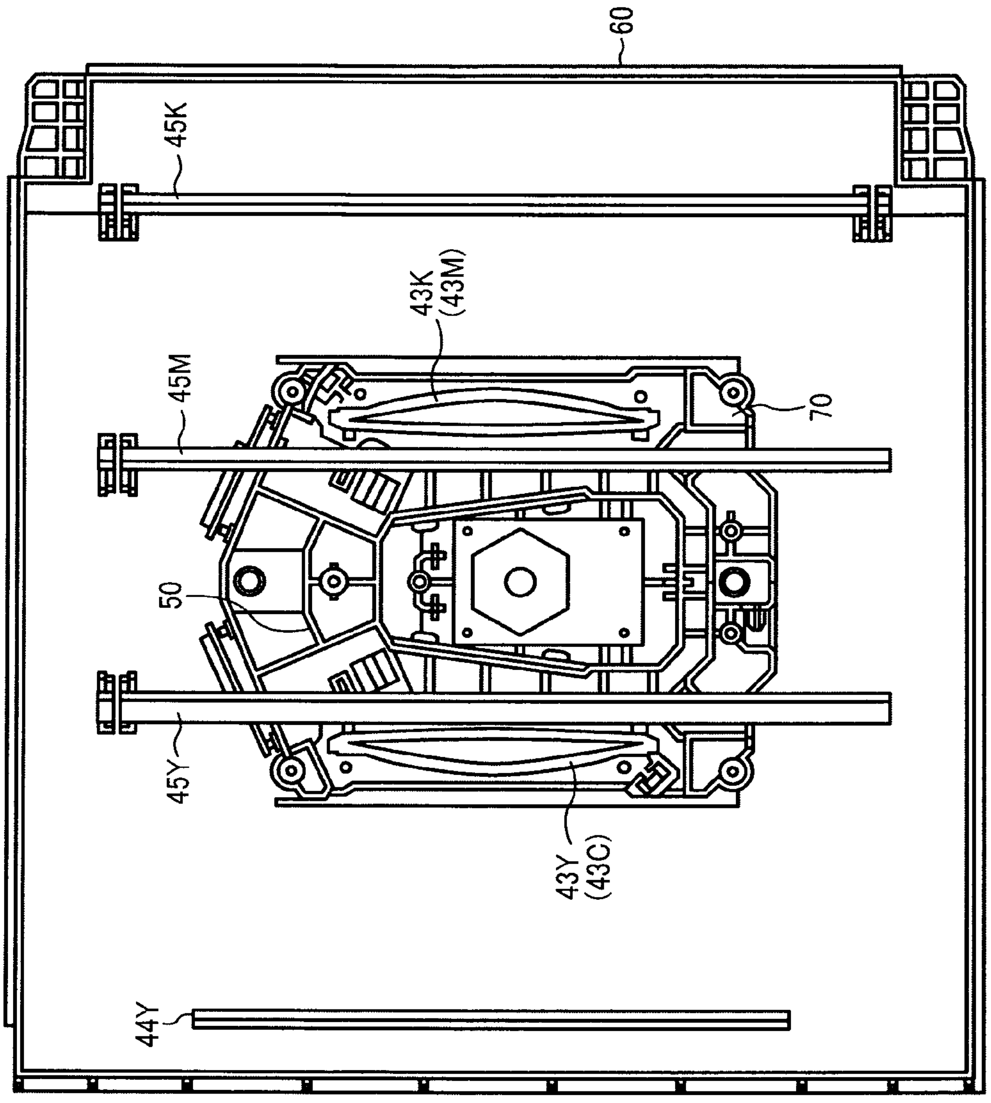
FIG. 4 is a plan view of the optical writing unit of FIG. 3.
Figure 5:
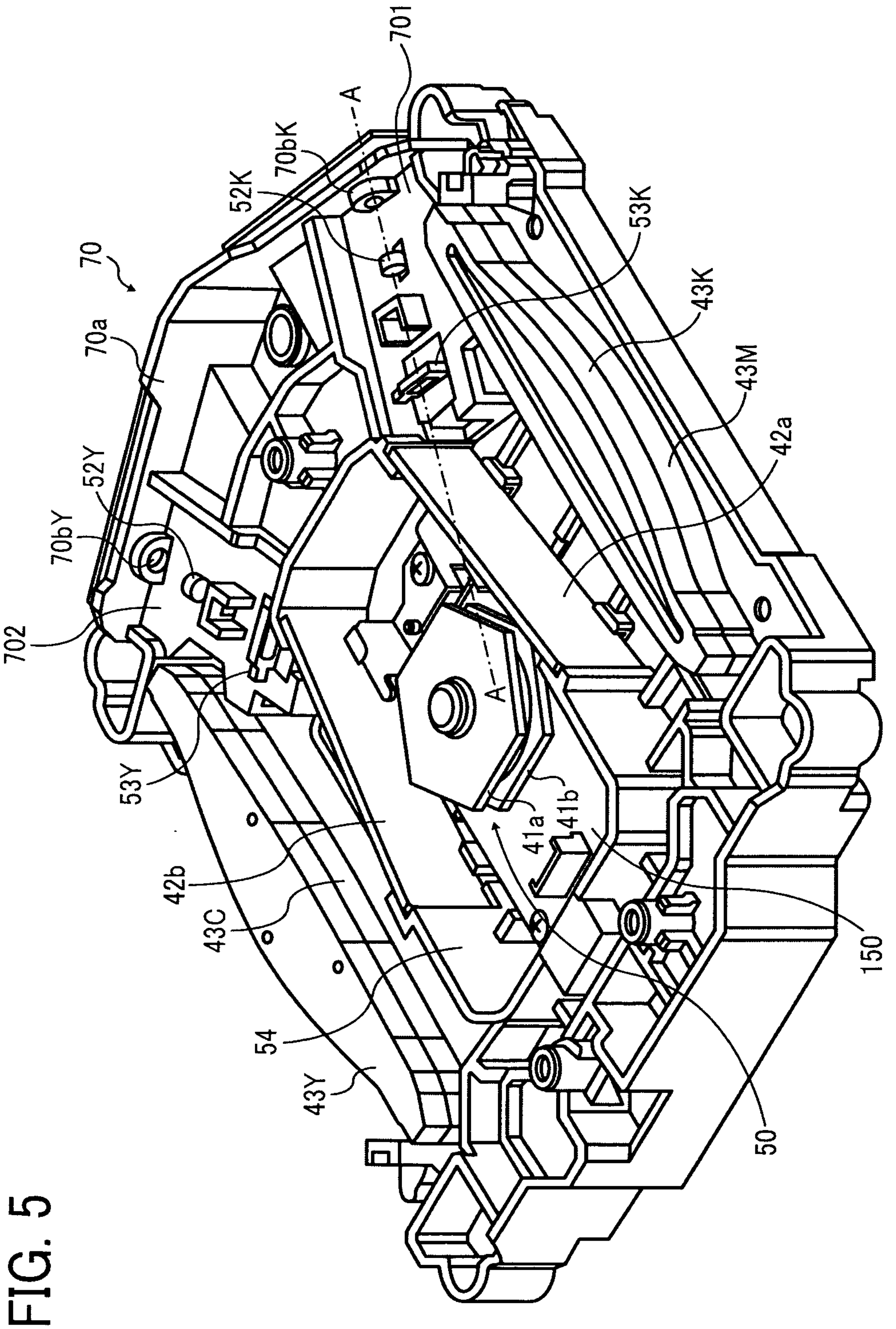
FIG. 5 is a schematic perspective view of a first enclosure of the optical writing unit.
Figure 6:
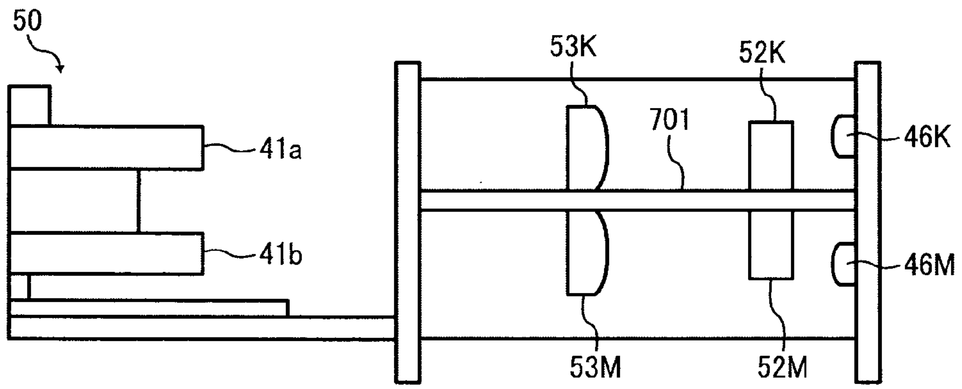
FIG. 6 is a schematic cross-sectional view of the first enclosure along a line A-A in FIG. 5.

With reference to FIGS. 3 through 6, a description is provided of the optical writing unit 4. FIG. 3 is a schematic diagram illustrating the photoconductive drums 10Y through 10K and the optical writing unit 4 employed in the image forming apparatus. FIG. 4 is a plan view of the optical writing unit 4 of FIG. 3. FIG. 5 is a schematic perspective view of a first enclosure 70 of the optical writing unit 4. FIG. 6 is a schematic cross-sectional view of the first enclosure 70 along a line A-A in FIG. 5.

As illustrated in FIG. 3, the optical writing unit 4 serving as the optical scanner includes optical devices such as a polygon scanner 50, various reflective mirrors, lenses, and so forth. The optical devices such as the polygon scanner 50, the reflective mirrors, the lenses, and so forth are disposed in an optical housing 131. The optical housing 131 is open at the top. A cover 107 covers the top of the housing 131. The cover 107 includes dust proof glass panels 48Y, 48C, 48M, and 48K.

As illustrated in FIG. 4, the optical housing 131 consists of the first enclosure 70 and a second enclosure 60. The first enclosure 70 and the second enclosure 60 are made of resin. The first enclosure 70 encloses optical parts disposed on optical paths between the light source, and scanning lenses 43Y, 43C, 43M, and 43K. The second enclosure 60 encloses optical parts disposed on optical paths between the scanning lenses 43Y, 43C, 43M, and 43K, and the photoconductive drums 10Y, 10C, 10M, and 10K.

As illustrated in FIGS. 5 and 6, the first enclosure 70 encloses laser diodes 46Y, 46C, 46M, and 46K, collimating lenses 52Y, 52C, 52M, and 52K, cylindrical lenses 53Y, 53M, 53C, and 53K, the polygon scanner 50 serving as a rotary deflector, and the scanning lenses 43Y, 43M, 43C, and 43K. (For simplicity, the laser diodes 46Y and 46C, the collimating lens 52C, and the cylindrical lens 53C are not illustrated.)

As illustrated in FIG. 5, the polygon scanner 50 includes the polygon mirrors 41*a* and 41*b*, a polygon motor (not illustrated), and a circuit board 150 equipped with electrical parts that control the polygon motor. The six sides of each of the polygon mirrors 41*a* and 41*b* are reflective mirror surfaces. The polygon mirrors 41*a* and 41*b* are connected in a lateral direction such that the center of the regular polygonal prism of the polygon mirror 41*a* and the center of the regular polygonal prism of the polygon mirror 41*b* are aligned one atop the other, that is, are concentric. The polygon scanner 50 is fixed to a mounting portion of the first enclosure 70 surrounded by a soundproof wall 54 by a screw. The soundproof wall 54 includes two notches at which soundproof glass panels 42*a* and 42*b* are mounted.

The laser diodes 46Y, 46C, 46M, and 46K serving as light sources are attached to through-holes 70*b* formed in a side surface 70*a* of the first enclosure 70. It is to be noted that in FIG. 5 only a through-hole 70*b*K and a through-hole 70*b*Y are illustrated. The laser diode 46K for black is attached to the through-hole 70*b*K, and laser diode 46Y for the color yellow is attached to the through-hole 70*b*Y. As illustrated in FIG. 6, the laser diode 46K for the color black is disposed above the laser diode 46M for the color magenta.

The collimating lens 52K and the cylindrical lens 53K are attached to an upper surface of a first base 701. The collimating lens 52M is attached to a bottom surface of the first base 701 below the collimating lens 52K. The cylindrical lens 53M is attached to the bottom surface of the first base 701 below the cylindrical lens 53K. Similarly, although not illustrated, the laser diode 46Y yellow is disposed below the laser diode 46C. The collimating lens 52Y and the cylindrical lens 53Y are attached to an upper surface of a second base 702. Although not illustrated, the collimating lens 52C is attached to the bottom surface of the second base 702 below the collimating lens 52Y. The cylindrical lens 53C is attached to the bottom surface of the second base 702 below the cylindrical lens 53Y.

The scanning lens 43K is disposed immediately above the scanning lens 43M. The scanning lens 43Y is disposed immediately above the scanning lens 43C. The scanning lenses 43Y, 43M, 43C, and 43K convert the angular motion of the scanning laser by the polygon mirrors 41*a* and 41*b* to linear motion, and focus light in the sub-scanning direction. Furthermore, the scanning lenses 43Y, 43M, 43C, and 43K correct a face tangle error of the polygon mirrors.

As illustrated in FIG. 3, the optical systems for the colors magenta (M) and black (K) are disposed at the right side of the polygon scanner 50. The optical systems for the colors yellow (Y) and cyan (C) are disposed at the left side of the polygon scanner 50.

Figure 7:
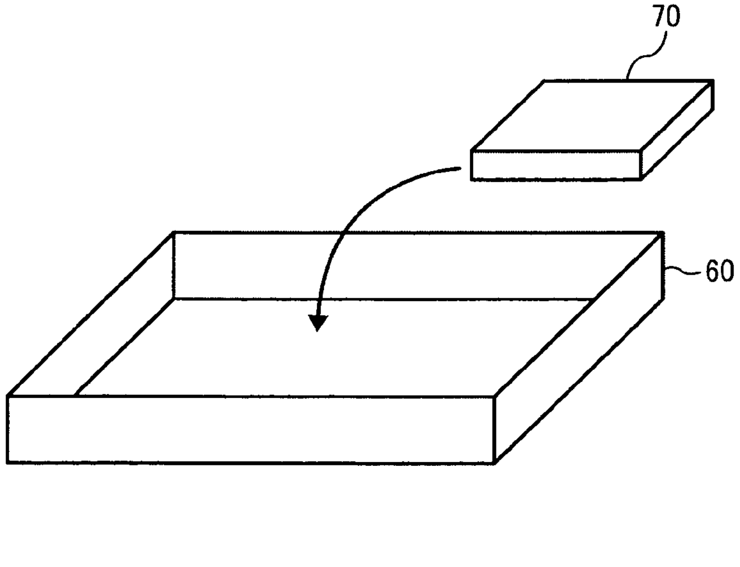
FIG. 7 is a schematic diagram illustrating the first enclosure installed in a second enclosure, according to an illustrative embodiment of the present invention.

As illustrated in FIGS. 4 and 7, the first enclosure 70 is disposed substantially at the center of the second enclosure 60 such that the polygon scanner 50 comes substantially at the center of the optical writing unit 4. FIG. 7 is a schematic diagram illustrating the first enclosure 70 installed in a second enclosure 60.

As illustrated FIG. 3, the cover 107 includes an opening at the center thereof. An inner wall 106 is provided such that the inner wall 106 extends from the opening of the cover towards the polygon scanner side. More specifically, the bottom end of the inner wall 106 contacts the upper surface of the soundproof glass panels 42*a* and 42*b*, as well as the upper surface of the soundproof wall 54 (shown in FIG. 5). A deflector cover 105 is provided to cover the opening of the cover 107. With this configuration, the polygon scanner 50 is sealed by the bottom surface of the housing 131, the soundproof glass panels 42*a* and 42*b*, the soundproof wall 54, the inner wall 106, and the deflector cover 105.

The write light beams Ly, Lc, Lm, and Lk projected from the laser diodes 46Y, 46C, 46M, and 46K, respectively, are collimated into parallel light fluxes by the collimating lenses 52Y, 52C, 52M, and 52K, and then pass through the cylindrical lenses 53Y, 53C, 53M, and 53K. After passing through the cylindrical lenses 53Y, 53C, 53M, and 53K, the light fluxes are focused in the sub-scanning direction (equivalent to the surface moving direction of the photoconductive drums 10 on the photoconductive drums). Subsequently, the light fluxes are reflected by the mirror surfaces of the polygon mirrors 41*a* and 41*b* rotated at high speed by the polygon motor, thereby deflecting the light fluxes in the main scanning direction (equivalent to the axial direction on the surface of the photoconductive drums 10). The moving speed of the light fluxes deflected in the main scanning direction at a constant angular velocity by the polygon mirrors 41*a* and 41*b* is converted into a constant speed by the scanning lenses 43Y, 43M, 43C, and 43K, while the light fluxes are focused in the sub-scanning direction, and the face tangle error of the mirror surfaces of the polygon mirrors 41*a* and 41*b* is corrected.

The write light beams Ly, Lc, Lm, and Lk passed through the scanning lenses 43Y, 43C, 43M, and 43K are directed to the respective reflective mirrors of the optical systems of yellow, cyan, magenta, and black. For example, the write light beam Ly for the color yellow passed through the scanning lens 43Y is reflected by a first reflective mirror 44Y and a second reflective mirror 45Y so that the write light beam Ly is directed to the surface of the photoconductive drum 10Y.

Similar to the write light beam Ly, the write light beams Lc, Lm, and Lk are reflected by first reflective mirrors 44C, 44M, and 44K, and second reflective mirrors 45C, 45M, and 45K so that the write light beams Lc, Lm, and Lk are directed to the surfaces of the photoconductive drums 10C, 10M, and 10K. The write light beams Ly, Lc, Lm, and Lk reflected by the second reflective mirrors 45Y, 45C, 45M, and 45K pass through the dust proof glasses 48Y, 48C, 48M, and 48K of the cover 107, and then arrive at the photoconductive drums 10Y, 10C, 10M, and 10K.

Figure 8:
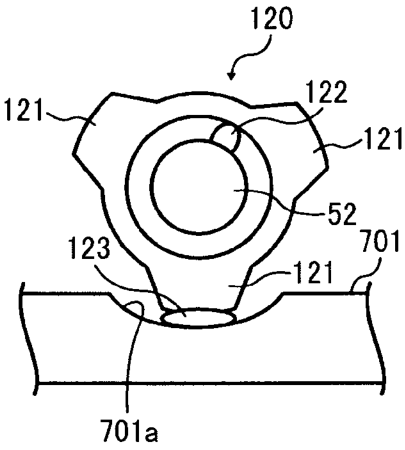
FIG. 8 is a schematic diagram illustrating a lens retainer and a collimating lens as viewed along an optical axis.

With reference to FIG. 8, a description is provided of installation of the collimating lens 52 in the optical scanning unit 4 according to the illustrative embodiment of the present invention. FIG. 8 is a schematic diagram illustrating a lens retainer 120 and the collimating lens 52 as viewed from an optical axis direction.

According to the illustrative embodiment, the collimating lens 52 is fixed to the lens retainer 120 serving as an intermediate member using an adhesive agent. More specifically, the collimating lens 52 held by the lens retainer 120 is fixed to the base 701 (702) of the first enclosure 70 via the lens retainer 120.

As illustrated in FIG. 8, the lens retainer 120 has an annular shape and includes a plurality of flanges 121 provided on the circumferential surface of the lens retainer 120 at equal intervals. More specifically, the lens retainer 120 has three flanges projecting from the circumferential surface thereof. The flanges 121 serve as housing attachment portions that are fixed to the first enclosure 70.

The collimating lens 52 is fixed to the inner surface of the lens retainer 120 using an adhesive agent. The lens retainer 120 is formed of substantially transparent material that allows ultraviolet (UV) light to pass therethrough.

The collimating lens 52 is fixed to the lens retainer 120 by holding a flange or a ridge of the collimating lens 52 and inserting it into the lens retainer 120. Subsequently, a portion of a space between the collimating lens 52 and the lens retainer 120 is filled in with a UV curable adhesive agent 122 and illuminated with UV light so that the adhesive agent 122 is cured. Accordingly, the collimating lens 52 is fixed to the lens retainer 120.

Since the lens retainer 120 is made of material allowing the UV light to penetrate, the adhesive agent 122 can be illuminated with the UV light through the lens retainer 120. Accordingly, the collimating lens 52 is fixed to the lens retainer 120 with ease.

The lens retainer 120 holding the collimating lens 52 is attached to the base 701 of the first enclosure 70 as follows.

First, the lens retainer 120 is held by a chuck, not illustrated, that can adjust the position of the lens retainer 120 in the axial direction, the sub-scanning direction (a direction perpendicular to the base of the first enclosure 70), and the main scanning direction (a direction orthogonal to both the axial direction and the sub-scanning direction). One of the flanges 121 of the lens retainer 120 faces a lens mounting portion 701*a* of the base 701.

Subsequently, while monitoring optical characteristics, the position of the lens retainer 120 is adjusted by moving the chuck such that desired optical characteristics of the scan light are obtained on the photoconductive drums. After the desired optical characteristics are obtained, a portion of a space between the lens mounting portion 701*a* and the flange 121 is filled with a UV curable adhesive agent 123, and illuminated with UV light so that the adhesive agent 122 is cured. Accordingly, the lens retainer 120 is fixed to the lens mounting portion 701*a*.

According to the above-described illustrative embodiment, after adjusting the position of the lens retainer 120, the adhesive agent 123 enters the space between the lens mounting portion 701*a* and the flange 121. Since the lens retainer 120 is made of material allowing the UV light to penetrate therethrough, the adhesive agent 123 can be illuminated with the UV light through the lens retainer 120. Accordingly, the lens retainer 120 is fixed to the lens mounting portion 701*a* with ease. After the lens retainer 120 is fixed, the chuck is removed.

When recycling the collimating lens 52, the lens retainer 120 is separated from the lens mounting portion 701*a* by holding the lens retainer 120. With this configuration, when recovering the collimating lens 52 from the optical writing unit 4, the collimating lens 52 is not held directly. The optical surfaces such as a light incident surface and a projection surface of the collimating lens 52 are prevented from getting touched by fingers and hence protected from damage. Furthermore, when separating from the lens mounting portion 701*a*, the collimating lens 52 receives no stress. As a result, when removing the collimating lens 52 from the optical writing unit 4, fluctuation of the optical characteristics of the collimating lens 52 is prevented.

Figure 9:
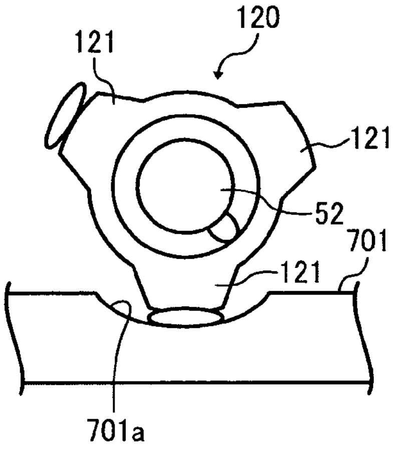
FIG. 9 is a schematic diagram illustrating the lens retainer attached again to a lens mounting portion.

When using the recycled collimating lens 52 in another optical writing unit after the collimating lens 52 is removed from the optical writing unit 4, as illustrated in FIG. 9, one of the flanges 121, different from the one that has been used previously, is disposed facing the lens mounting portion 701*a* and fixed using the adhesive agent. FIG. 9 is a schematic diagram illustrating one of the flanges 121, different from the one that has been used previously, is fixed to the lens mounting portion 701*a* using the adhesive agent 123.

According to the above-described illustrative embodiment, the lens retainer 120 includes a plurality of the flanges 121. As the collimating lens 52 is recycled, the flange 121 having a clean surface on which no adhesive agent or the like remains is attached to the lens mounting portion 701*a* of the first enclosure 70. Accordingly, the flange 121 is adhered reliably to the lens mounting portion 701*a*.

If the flange 121 on which the adhesive agent 123 remains undesirably is used again, enough space is not secured between the flange 121 and the lens mounting portion 701*a*. Consequently, an amount of adhesive agent 123 to enter between the flange 121 and the lens mounting portion 701*a* is reduced, and hence the lens retainer 120 is not securely fixed to the lens mounting portion 701*a*. If this occurs, the lens retainer 120 separates from the lens mounting portion 701*a* due to vibration during shipment and/or actual use.

Furthermore, the surface of the projection on which the adhesive agent 123 remains hinders adjustment of the position of the lens retainer 120 in the sub-scanning direction (the direction perpendicular to the base of the first enclosure 70), thereby complicating fine adjustment.

The polygon scanner 50, the laser diodes 46, and so forth in the optical writing unit 4 are also subjected to recycling when reaching the end of their product life cycles. When the polygon mirror 50 and the laser diodes 46 are replaced with new ones, the relative positions of the collimating lens 52 and these parts are changed, thereby complicating efforts to achieve desired optical characteristics. In order to achieve the desired optical characteristics, the orientation and the position of the collimating lens 52 need to be readjusted. In such a case, the collimating lens 52 needs to be separated from the first enclosure 70 by separating the lens retainer 120 from the lens mounting portion 701*a*.

If the adhesive agent 123 remains on the lens mounting portion 701*a*, the lens retainer 120 does not adhere well to the lens mounting portion 701*a*. As a result, the optical writing unit 4 cannot be reused.

In view of the above, according to the above-described embodiment, the adhesive agent 123 sticks to the lens retainer 120, rather than the lens mounting portion 701*a* as the lens retainer 120 is separated from the first enclosure 70. In particular, the lens retainer 120 is made of material to which the adhesive agent 123 sticks more firmly than to the first enclosure 70. With this configuration, as the lens retainer 120 is separated from the lens mounting portion 701*a*, the adhesive agent 123 sticks to the lens retainer 120 rather than to the lens mounting portion 701*a*, thereby preventing the adhesive agent 123 from remaining on the lens mounting portion 701*a*.

As illustrated in FIG. 9, one of the flanges 121, other than the one that has been used previously, is disposed facing the lens mounting portion 701*a* and fixed thereto using the adhesive agent 123 after the position of the collimating lens 52 is adjusted. Accordingly, the adhesive agent 123 sticks to the lens retainer 120 as the lens retainer 120 is separated from the lens mounting portion 701*a*, thereby facilitating recycle of the optical writing unit 4.

Figure 10:
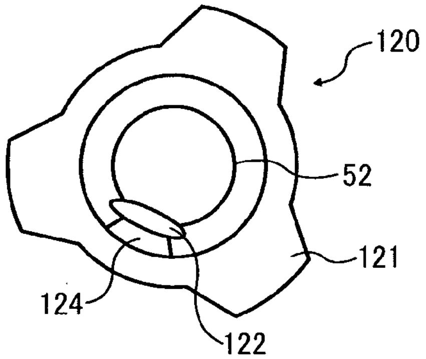
FIG. 10 is a schematic diagram illustrating the lens retainer including an optical part mount on an inner circumference thereof.

With reference to FIG. 10, a description is provided of the lens retainer 120 according to another illustrative embodiment. FIG. 10 is a schematic diagram illustrating the lens retainer 120 including an optical part mount 124 projecting from an inner circumference of the lens retainer 120.

The optical part mount 124 serving as an optical part attachment portion is provided on the inner circumference of the lens retainer 120 to fix the collimating lens 52 on the inner circumference of the lens retainer 120 using an adhesive agent. The optical part mount 124 projects from the inner circumference of the lens retainer 120. With this configuration, the center of the lens retainer 120 is brought close to the center of the collimating lens 52 without thickening the adhesive agent 122, and fluctuation of the optical characteristics due to thermal expansion of the adhesive layer between the lens retainer 120 and the collimating lens 52 is suppressed. When using an optical element such as the collimating lens 52 having optical characteristics that do not change even after rotating about the optical axis, the lens retainer 120 may have an annular shape and include the optical part mount 124 on the inner circumference thereof and a plurality of the flanges 121 on the outer circumference thereof.

Next, a description is provided of an effect of having the center of the intermediate transfer member 120 close to the center of the collimating lens 52. For example, if the center of the collimating lens 52 is toward one of the flanges 121 (housing attachment portion) and this flange 121 is adhered to the lens mounting portion 701*a*, the distance between the flange 121 and the collimating lens mounting portion 701*a* is longer than when the center of the lens retainer 120 is aligned with the center of collimating lens 52, thus requiring a significant amount of the adhesive agent 123 between the flange 121 and the lens mounting portion 701*a*. As a result, the thickness of the adhesive layer of the adhesive agent 123 between the flange 121 and the lens mounting portion 701*a* increases.

As the adhesive layer of the adhesive agent 123 is thick, an amount of thermal expansion thereof increases, thereby increasing fluctuation of the optical characteristics when the temperature of the optical writing unit 4 rises.

By contrast, if the center of the lens retainer 120 and the center of the collimating lens 52 are close, the space between the flange 121 and the lens mounting portion 701*a* is not large when adhering any one of the flanges 121 to the lens mounting portion 701*a*, hence reducing the thickness of the adhesive layer of the adhesive agent 123.

Figure 11A:
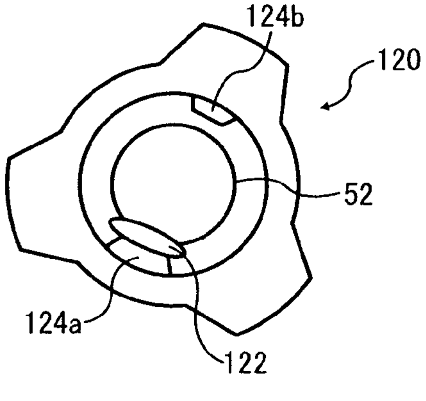
FIGS. 11A and 11B are schematic diagrams illustrating the lens retainer including a plurality of the optical part mounts.
Figure 11B:
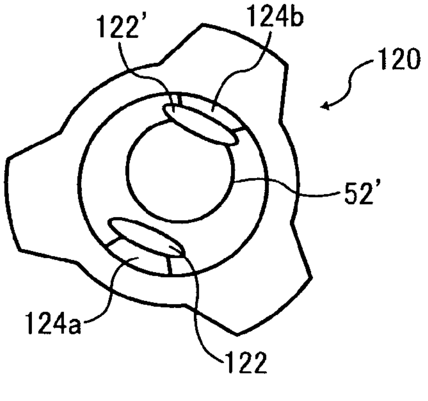

With reference to FIG. 11, a description is provided of another illustrative embodiment. According to the present embodiment, the lens retainer 120 includes a plurality of the optical part mounts 124 on the inner circumference of the lens retainer 120. FIG. 11 is a schematic diagram illustrating the lens retainer 120 including the plurality of the optical part mounts 124 serving as optical part attachment portions on the inner circumference of the lens retainer 120. According to the present embodiment, when replacing the collimating lens 52 due to a change in a specification or the like, a new collimating lens is adhered to the different optical part mount 124.

As illustrated in FIG. 11, the lens retainer 120 includes a first optical part mount 124*a* to which the collimating lens 52 is attached initially and a second optical part mount 124*b* having the height less than that of the first optical part mount 124*a*. Because the first optical part mount 124*a* projects from the inner circumference of the lens retainer 120 to some extent, the center of the lens retainer 120 and the center of the collimating lens 52 can be close. When the collimating lens 52 attached to the first optical part mount 124*a* is removed therefrom upon replacement, the adhesive layer of the adhesive agent 122 may remain on the first optical part mount 124*a*.

If the height of the second optical part mount 124*b* is the same as the height of the first optical part mount 124*a*, when the new collimating lens having the diameter greater than that of the collimating lens 52 is attached to the lens retainer 120, the adhesive layer of the adhesive agent 122 hinders installation of the new collimating lens. In this case, the adhesive layer of the adhesive agent 122 needs to be removed from the first optical part mount 124*a*, complicating installation of the new collimating lens.

By contrast, as illustrated in FIG. 11, if the height of the second optical part mount 124*b* from the inner circumference is less than the height of the first optical part mount 124*a*, when a new collimating lens 52' having the diameter greater than that of the collimating lens 52 is attached to the lens retainer 120, the adhesive layer of the adhesive agent 122 remaining on the first optical part mount 124*a* does not hinder installation of the new collimating lens 52'.

Figure 12:
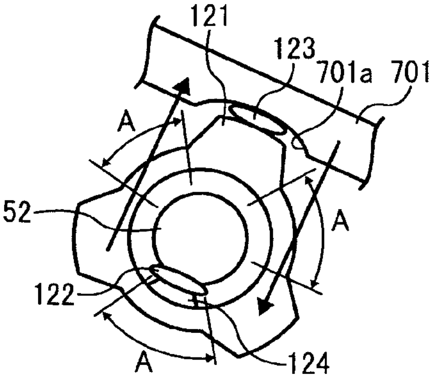
FIG. 12 is a schematic diagram illustrating the lens retainer including the optical part mount provided between flanges of the lens retainer.

As illustrated in FIG. 12, it is preferable to provide the optical part mount 124 in an area A between the flanges 121. If the optical part mount 124 is provided at the back of the flange 121 and this flange 121 is fixed to the lens mounting portion 701*a*, the thermal expansion of the adhesive layer of the adhesive agent 123 coincides with the thermal expansion of the adhesive layer of the adhesive agent 122, thereby doubling the effect of the adhesive layer. As a result, fluctuation of the optical characteristics increases as the temperature of the optical writing unit 4 increases.

In view of the above, according to the illustrative embodiment, the direction of the thermal expansion of the adhesive layer of the adhesive agent 123 is different from the direction of the thermal expansion of the adhesive layer of the adhesive agent 122 by providing the optical part mount 124 in the area A between the flanges 121 as illustrated in FIG. 12. With this configuration, fluctuations of the optical characteristics due to thermal expansion of the adhesive agents 122 and 123 are suppressed, if not prevented entirely.

An odd number of the flanges 121 may be provided. In this configuration, as illustrated in FIG. 12, the direction of the thermal expansion of the adhesive agent 122 can be opposite from the thermal expansion of the adhesive agent 123 at least once. As a result, fluctuation of the optical characteristics due to thermal expansion of the adhesive layer is suppressed reliably, if not prevented entirely.

Figure 13:
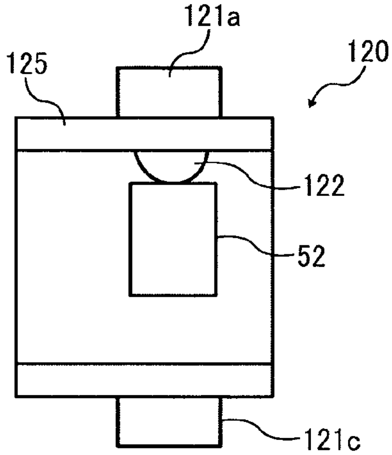
FIG. 13 is a schematic cross-sectional view illustrating the lens retainer including a protecting portion.

As illustrated in FIG. 13, the lens retainer 120 may be cylindrical and include a protecting portion 125 to protect the collimating lens 52. FIG. 13 is a schematic cross-sectional view of the lens retainer 120 including the protecting portion 125. With this configuration, the collimating lens 52 is protected from damage when removing the collimating lens 52 from the optical writing unit 4 and placed temporarily on a desk or the like. In particular, the optical surfaces of the collimating lens such as the light incident surface and the light projection surface are prevented from touching the desk and getting damaged.

In FIG. 13, the entire intermediate member 120 extends in the optical axis direction so that it can serve as the protecting portion 125. Alternatively, at least a portion of the lens retainer 120 extends in the optical axis direction to serve as the protecting portion. The leading edge of the protecting portion 125 provided entirely or partially to the lens retainer 120 touches the desk or the like first, thus preventing the light incident surface and the light projection surface of the collimating lens 52 from getting damaged.

Figure 14A:
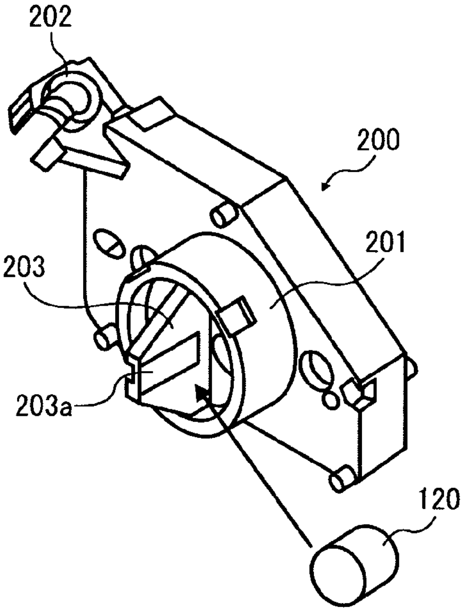
FIG. 14A is a schematic perspective view of an LD unit before the lens retainer and the collimating lens are mounted, according to an illustrative embodiment of the present invention.
Figure 14B:
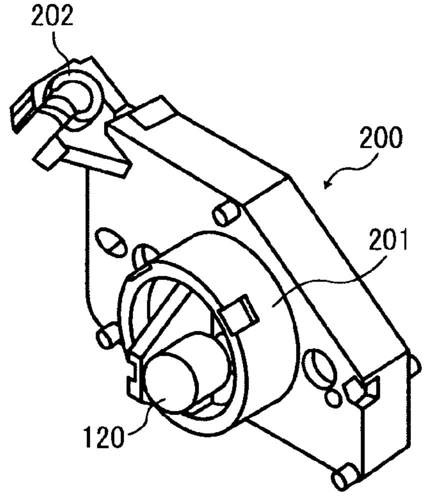
FIG. 14B is a schematic perspective view of an LD unit in which the lens retainer and the collimating lens are mounted, according to an illustrative embodiment of the present invention.

With reference to FIGS. 14A and 14B, a description is provided of recycle of an LD unit 200 equipped with the laser diode 46 and the collimating lens 52 according to the illustrative embodiment. FIG. 14A is a schematic diagram illustrating the LD unit 200 before the lens retainer 120 is mounted. FIG. 14B is a schematic diagram illustrating the LD unit 200 in a state in which the lens retainer 120 is attached thereto.

As illustrated in FIG. 14A, the LD unit 200 includes a cylinder portion 201, an adjuster 202, and a separation wall 203 having a lens mounting portion 203*a*. The cylinder portion 201 is attached to the housing of the optical writing unit 4 by fitting into a through hole formed in a surface of the housing of the optical writing unit 4. The adjuster 202 adjusts an orientation of the LD unit 200 using an adjusting screw, not illustrated, attached to the adjuster.

As illustrated in FIG. 14B, the lens retainer 120 bearing the collimating lens 52 is adhered to the lens mounting portion 203*a* of the separation wall 203 that divides the cylinder portion 201 of the LD unit 200. In a case in which the product life of the laser diode reaches the end and the laser diode is replaced, the positional relation between the laser diode 46 and the collimating lens 52 changes. Thus, the position of the collimating lens 52 needs to be adjusted again.

In such a case, similar to the foregoing embodiment, the lens retainer 120 is separated from the lens mounting portion 203*a*, and the different attachment surface of the lens retainer 120 is positioned opposite the lens mounting portion 203*a*, and the position is adjusted. Subsequently, the lens retainer 120 is fixed to the lens mounting portion 203*a* using the adhesive agent. Accordingly, the LD unit 200 can be recycled.

In a case in which the LD unit 200 can no longer be used in an image forming apparatus due to a change in a specification or the like, the lens retainer 120 bearing the collimating lens 52 can be removed from the LD unit 200 and used in a different optical writing unit.

The foregoing descriptions pertain to removal and installation of the collimating lens 52. However, the present invention is not limited to this. The present invention can be applied to optical parts, for example, a temperature-compensated lens, as long as the optical characteristics thereof do not fluctuate after being rotated about the optical axis.

Furthermore, the present invention can be applied to the optical parts that can obtain the same optical characteristics as the optical characteristics prior to rotation of the optical parts when rotating by certain degrees, for example, 180 degrees.

In a case of the optical parts that can obtain the same optical characteristics as the optical characteristics prior to rotation of the optical parts by rotating 180 degrees, two flanges 121 are disposed with a predetermined interval between each other, for example, 180 degrees apart.

According to the illustrative embodiment, the optical parts are fixed indirectly to the housing. That is, the optical parts are fixed through the retainer. With this configuration, when removing the optical parts from the housing, the optical parts is not handled directly so that the optical parts are protected from damage. Because the retainer has multiple flanges disposed along an outer circumference thereof, when a new optical part is attached to the retainer, the flange that has not been used previously is used to attach the optical part. Accordingly, the flange having a clean surface can be used, allowing the new optical part to adhere well to the flange.

According to the illustrative embodiment, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising:

a light source to project light against a target;

an optical part disposed on a light path between the light source and the target;

a housing to house the light source and the optical part; and a retainer fixed to the housing to hold the optical part and including a plurality of flanges, one of the flanges being adhered to the housing using an adhesive agent, wherein the retainer has an annular shape and includes an inner circumference thereof to which the optical part is fixed.

2. The optical scanner according to claim 1, wherein the optical part is an optical element has optical characteristics that remain constant about an optical axis.

3. The optical scanner according to claim 2, wherein the optical part is a collimating lens.

4. The optical scanner according to claim 1, wherein the plurality of the flanges is disposed along an outer circumference of the retainer.

5. The optical scanner according to claim 1, wherein an optical part mount projects from the inner circumference of the retainer and the optical part is fixed to the optical part mount using the adhesive agent.

6. The optical scanner according to claim 5, comprising a plurality of optical part mounts, wherein the optical part is adhered to one of the plurality of optical part mounts using the adhesive agent.

7. The optical scanner according to claim 6, wherein an amount of projection of the plurality of optical part mounts from the inner circumference differs between two optical part mounts.

8. The optical scanner according to claim 5, wherein the optical part mount is provided between the flanges of the retainer.

9. The optical scanner according to claim 1, wherein the retainer is made of material having high ultraviolet (UV) light transmissivity.

10. The optical scanner according to claim 1, wherein the adhesive agent is UV light-curable.

11. An image forming apparatus, comprising:

an image bearing member to bear a latent image on a surface thereof;

the optical scanner of claim 1 to illuminate the surface of the image bearing member with light to form the latent image; and a developing device to develop the latent image formed on the image bearing member using toner.

12. An optical scanner, comprising:

a light source to project light against a target;

an optical part disposed on a light path between the light source and the target;

a housing to house the light source and the optical part; and a retainer fixed to the housing to hold the optical part and including a plurality of flanges, one of the flanges being adhered to the housing using an adhesive agent, wherein at least the flanges of the retainer are made of material to which the adhesive agent adheres more firmly than to the housing.

13. An optical scanner, comprising:

a light source to project light against a target;

an optical part disposed on a light path between the light source and the target;

a housing to house the light source and the optical part; and a retainer fixed to the housing to hold the optical part and including a plurality of flanges, one of the flanges being adhered to the housing using an adhesive agent, wherein at least a portion of the retainer is longer than the optical part in the optical axis direction.

* * * * *